US011867132B2

(12) United States Patent
Ayukawa et al.

(10) Patent No.: US 11,867,132 B2
(45) Date of Patent: Jan. 9, 2024

(54) DRIVE CONTROL DEVICE FOR INTERNAL COMBUSTION ENGINE

(71) Applicant: DENSO CORPORATION, Kariya (JP)

(72) Inventors: Ken Ayukawa, Kariya (JP); Shinichi Hiraoka, Kariya (JP); Daigo Itou, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/829,711

(22) Filed: Jun. 1, 2022

(65) Prior Publication Data

US 2022/0290624 A1    Sep. 15, 2022

Related U.S. Application Data

(63) Continuation of application No. PCT/JP2020/045236, filed on Dec. 4, 2020.

(30) Foreign Application Priority Data

Dec. 5, 2019  (JP) ................................. 2019-220252

(51) Int. Cl.
F02D 41/04     (2006.01)
F02D 13/02     (2006.01)
F02D 41/06     (2006.01)
F02D 41/40     (2006.01)

(52) U.S. Cl.
CPC ....... *F02D 41/047* (2013.01); *F02D 13/0215* (2013.01); *F02D 41/062* (2013.01); *F02D 41/402* (2013.01); *F02D 2200/021* (2013.01); *F02D 2200/101* (2013.01)

(58) Field of Classification Search
CPC .. F02D 41/047; F02D 13/0215; F02D 41/062; F02D 41/402; F02D 13/0265
See application file for complete search history.

(56) References Cited

U.S. PATENT DOCUMENTS

2002/0066436 A1 * 6/2002 Majima ............... F02D 41/0255
                                                          123/406.47
2003/0070637 A1 * 4/2003 Majima ................ F02D 41/047
                                                          60/284

(Continued)

FOREIGN PATENT DOCUMENTS

JP      2010-149533     7/2010
JP      2012-255366     12/2012

*Primary Examiner* — Sizo B Vilakazi
(74) *Attorney, Agent, or Firm* — Nixon & Vanderhye P.C.

(57) ABSTRACT

An internal combustion engine includes: a fuel injection valve injecting fuel; an intake timing varying mechanism controlling the opening/closing of an intake valve provided at an intake port; and an exhaust timing varying mechanism controlling the opening/closing of an exhaust valve provided at an exhaust port. When a request has been made to reduce a fuel wet amount, which is a quantity of fuel adhering to a wall surface of the internal combustion engine facing to an injection field where fuel is injected, in the startup of the internal combustion engine, the control device executes wet reduction control. In the wet reduction control, at least one of the intake timing varying mechanism or the exhaust timing varying mechanism is controlled so as to reduce the fuel wet amount by a counterflow blowing back toward the intake port.

14 Claims, 8 Drawing Sheets

(56) References Cited

U.S. PATENT DOCUMENTS

| | | | |
|---|---|---|---|
| 2007/0144470 A1* | 6/2007 | Murase | F02N 19/004 123/90.11 |
| 2010/0154740 A1* | 6/2010 | Mitsuishi | F02D 13/0261 123/347 |
| 2019/0301390 A1 | 10/2019 | Miyata et al. | |
| 2019/0331040 A1 | 10/2019 | Inoue et al. | |
| 2019/0353116 A1 | 11/2019 | Takata et al. | |
| 2020/0224623 A1 | 7/2020 | Fuse et al. | |
| 2020/0347795 A1 | 11/2020 | Toya et al. | |
| 2020/0400091 A1 | 12/2020 | Niwa et al. | |

\* cited by examiner

DRIVE CONTROL DEVICE FOR INTERNAL COMBUSTION ENGINE

CROSS REFERENCE TO RELATED APPLICATION

The present application is a continuation application of International Patent Application No. PCT/JP2020/045236 filed on Dec. 4, 2020, which designated the U.S. and claims the benefit of priority from Japanese Patent Application No. 2019-220252 filed on Dec. 5, 2019. The entire disclosures of all of the above applications are incorporated herein by reference.

TECHNICAL FIELD

The present disclosure relates to a drive control device for an internal combustion engine.

BACKGROUND

Conventionally, a known internal combustion engine employs a split injection to perform multiple injection in one cycle of the engine.

SUMMARY

According to an aspect of the present disclosure, a drive control device is configured to be applied to an internal combustion engine. The internal combustion engine includes a fuel injection valve, which is configured to inject fuel, an intake timing varying mechanism, which is configured to control opening/closing of an intake valve provided at an intake port, and an exhaust timing varying mechanism, which is configured to control opening/closing of an exhaust valve provided at an exhaust port.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
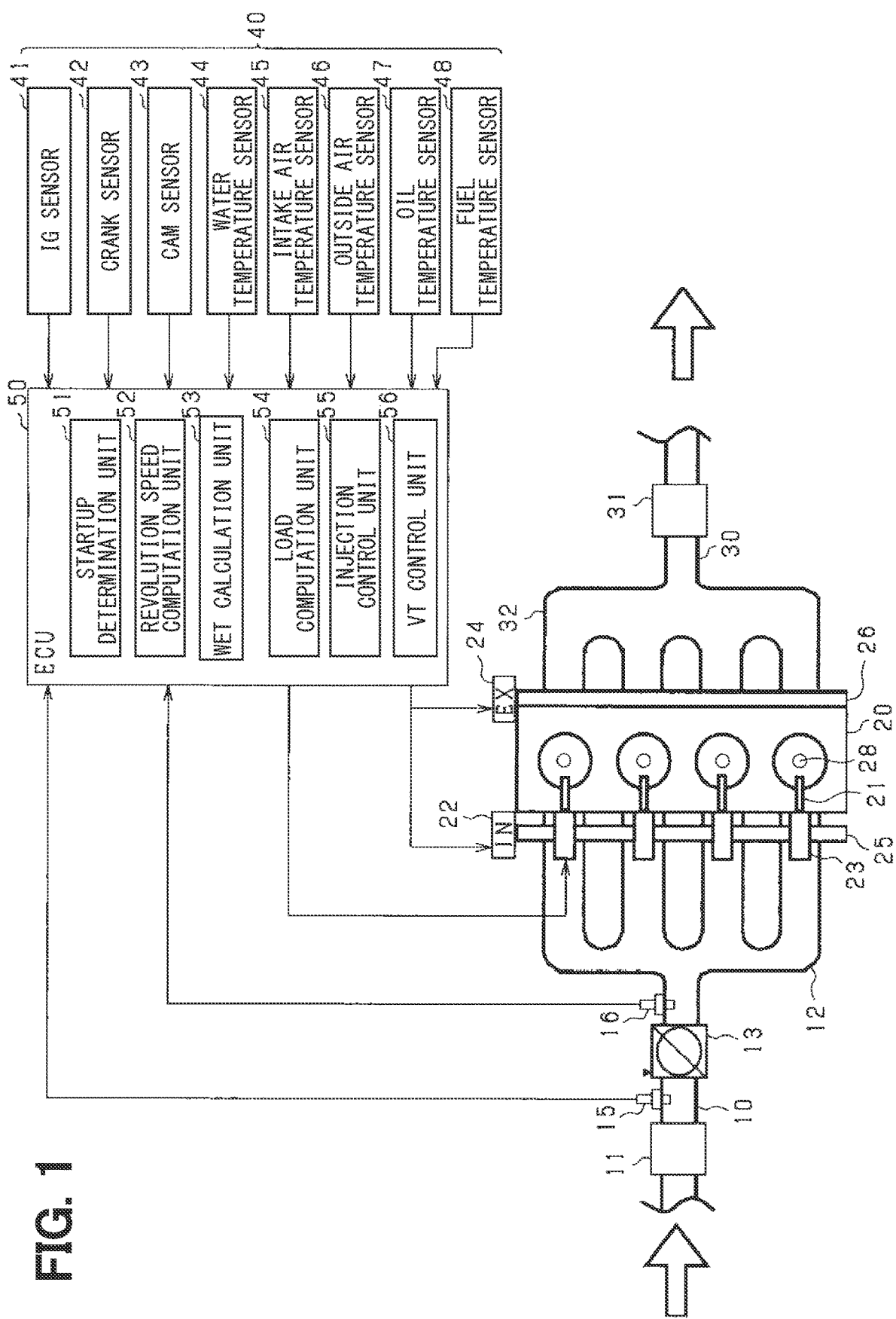
FIG. 1 is a schematic diagram of a drive system of an internal combustion engine according to an embodiment.

Hereinafter, examples of the present disclosure will be described.

In order to improve an emission contained in an exhaust from an internal combustion engine, it is assumable to divide a required injection quantity in one cycle into intake asynchronous injection and intake synchronous injection under a predetermined condition and to perform multi-injection processing in this order. The intake synchronous injection is an injection of fuel made in synchronization with valve opening timing of an intake valve and the intake asynchronous injection is an injection of fuel made with timing on the advance angle side relative to an intake synchronous injection.

According to an example of the present disclosure, in the multi-injection processing, an intake synchronous injection is supplementarily made based on findings that when the intake synchronous injection accounts for a large ratio, an amount of produced particulate matter number (PN) or the like becomes difficult to reduce or is increased. That is, an injection quantity in an intake synchronous injection is adjusted so as not to exceed an injection quantity in an intake asynchronous injection.

However, with an increased injection quantity in an intake asynchronous injection, a state (fuel wet) in which a droplet of fuel adheres to an inner wall surface of a combustion chamber of an internal combustion engine or the like may be prone to occur when a temperature in the combustion chamber is low or on other like occasions and this causes deterioration in emission or degradation in fuel economy.

According to an example of the present disclosure, an internal combustion engine includes a fuel injection valve, which is configured to inject fuel, an intake timing varying mechanism, which is configured to control opening/closing of an intake valve provided at an intake port, and an exhaust timing varying mechanism, which is configured to control opening/closing of an exhaust valve provided at an exhaust port.

A drive control device for the internal combustion engine comprises a valve timing control unit configured to execute a wet reduction control to control at least one of the intake timing varying mechanism and the exhaust timing varying mechanism to reduce a fuel wet amount, which is a quantity of fuel adhering to a wall surface of the internal combustion engine facing to an injection field where the fuel is to be injected, by a counterflow blowing back toward the intake port, when a request is made to reduce a fuel wet amount at the time of the startup of the internal combustion engine.

The drive control device according to the present disclosure is provided with the valve timing control unit. When the request is made to reduce the fuel wet amount, which is a quantity of fuel adhering to the wall surface of the internal combustion engine facing to the injection field in the internal combustion engine, because a temperature of the injection field is low or for other like reasons at the time of starting up the internal combustion engine, the valve timing control unit executes the wet reduction control. In the wet reduction control, the valve timing control unit controls at least one of the intake timing varying mechanism and the exhaust timing varying mechanism so as to reduce the fuel wet amount by the counterflow blowing back to the intake port side. According to the wet reduction control, an effect of an increased temperature of an injection field and other like effects are obtained by utilizing the counterflow blowing back to the intake port side and in addition an effect of a reduced fuel wet amount is obtained. As a result, a fuel wet in the internal combustion engine can be reduced to improve an emission.

First Embodiment

As shown in FIG. 1, a drive system of an internal combustion engine 20 of a vehicle includes an intake pipe 10, an intake manifold 12, the internal combustion engine 20, an exhaust manifold 32, an exhaust pipe 30, and ECU 50.

The internal combustion engine 20 is a four-cycle engine that is driven by combustion of such fuel as gasoline and repeatedly performs each stroke of intake, compression, expansion, and exhaust. The internal combustion engine 20 is a four-cylinder engine and a piston is housed in each cylinder. The intake manifold 12 and the exhaust manifold 32 are respectively branched into four according to the number of cylinders of the internal combustion engine 20. In the description of the present embodiment, a four-cylinder engine is taken as an example of the internal combustion engine 20 but any number of cylinders is acceptable. The internal combustion engine 20 is not limited to a gasoline engine but may be a diesel engine.

In the intake pipe 10, an air cleaner 11 and a throttle valve 13 are installed in this order from the upstream side. An airflow sensor 15 detecting an intake air quantity is installed downstream of the air cleaner 11 and upstream of the throttle valve 13. The intake manifold 12 is connected to the downstream side of the throttle valve 13. An intake pressure sensor 16 is installed downstream of the throttle valve 13 and upstream of the intake manifold 12. Air is supplied from the intake manifold 12 to each cylinder of the internal combustion engine 20. An exhaust emission purifying catalyst layer 31 is installed in the exhaust pipe 30 for purifying an exhaust from the internal combustion engine 20.

The internal combustion engine 20 includes a fuel injection valve 21, an intake timing varying mechanism 22, a variable valve lift mechanism 23, an exhaust timing varying mechanism 24, and an igniter 28. The fuel injection valve 21 injects fuel into each cylinder of the internal combustion engine 20. The intake timing varying mechanism 22 controls the opening/closing timing of an intake valve of the internal combustion engine 20. The variable valve lift mechanism 23 controls a lift amount of an intake valve. The exhaust timing varying mechanism 24 controls the opening/closing timing of an exhaust valve of the internal combustion engine 20. The igniter 28 is a spark plug and ignites fuel in a combustion chamber of the internal combustion engine 20 by energization.

The internal combustion engine 20 is configured so that power from a crankshaft (drive shaft), not shown, is transmitted to an intake-side camshaft 25 and an exhaust-side camshaft 26. The intake timing varying mechanism 22 is installed on the intake-side camshaft 25 and adjusts an advance angle amount of the intake-side camshaft 25 relative to the crankshaft. The exhaust timing varying mechanism 24 is installed on the exhaust-side camshaft 26 and adjusts an advance angle amount of the exhaust-side camshaft 26 relative to the crankshaft.

A sensor group 40 includes an ignition (IG) sensor 41, a crank sensor 42, a cam sensor 43, a water temperature sensor 44, an intake air temperature sensor 45, an outside air temperature sensor 46, an oil temperature sensor 47, a fuel temperature sensor 48, and the like. The sensor group 40 may further include:

an accelerator sensor detecting an accelerator operation amount (accelerator opening); a vehicle speed sensor detecting a vehicle speed; a brake sensor detecting a brake pedal operation amount; an in-cylinder pressure sensor detecting an in-cylinder pressure in a cylinder; a battery sensor detecting a voltage between terminals, a charging/discharging current, or the like of a battery; and the like. A signal from the sensor group 40 is successively inputted to the ECU 50.

The IG sensor 41 detects turn-on/off of an ignition of the internal combustion engine 20. A start of the internal combustion engine 20 can be detected with the IG sensor 41.

The crank sensor 42 detects a rotational position of the crankshaft relative to a reference position and a revolution speed NE of the internal combustion engine 20. The crank sensor 42 outputs a pulse signal each time the crank sensor detects a plurality of teeth formed at predetermined intervals around a rotor rotated together with the crankshaft of the internal combustion engine 20. The periphery of the rotor is provided with a portion where a predetermined number of teeth are continuously missing. For this reason, a portion (missing teeth signal portion) where a generation interval of pulse signals is a predetermined number times a generation interval of other pulse signals is produced in signals from the crank sensor 42.

The cam sensor 43 is a sensor that outputs a pulse signal each time the sensor detects one or more teeth formed on the rotor rotated together with the camshaft. The cam sensor 43 outputs a pulsed detection signal according to rotation of the intake-side camshaft 25 and the exhaust-side camshaft 26. A current crank position can be determined from a missing teeth signal portion in a detection signal from the crank sensor 42 and a detection signal from the cam sensor 43.

The water temperature sensor 44 detects a temperature of cooling water cooling the internal combustion engine 20. The intake air temperature sensor 45 detects a temperature of intake air sent from an intake valve into a combustion chamber of the internal combustion engine 20. The outside air temperature sensor 46 detects a temperature of outside air external to a vehicle mounted with the internal combustion engine 20. The oil temperature sensor 47 detects a temperature of lubricating oil of the internal combustion engine 20. The fuel temperature sensor 48 detects a temperature of fuel injected into the internal combustion engine 20.

The ECU 50 is an electronic control device provided with a microcomputer and the like comprised of publicly known CPU, ROM, RAM, and the like and functions as a drive control device exercising drive control on the internal combustion engine 20 and each actuator applied to the internal combustion engine 20 based on detection results of various sensors provided in the present system. More specifically, the ECU 50 executes opening control of the throttle valve 13, control of timing and a lift amount in the intake timing varying mechanism 22, the variable valve lift mechanism 23, and the exhaust timing varying mechanism 24, control of fuel injection by each fuel injection valve 21, and the like.

The ECU 50 computes a number of revolutions per unit time of the crankshaft, that is, a revolution speed NE of the internal combustion engine 20, based on a detection signal from the crank sensor 42. The ECU 50 makes a cylinder determination based on detection signals from the crank sensor 42 and the cam sensor 43.

The ECU 50 includes a startup determination unit 51, a revolution speed computation unit 52, a wet computation unit 53, a load computation unit 54, an injection control unit 55, and a VT (valve timing) control unit 56.

The startup determination unit 51 determines that the internal combustion engine 20 has been started based on a detection value from the IG sensor 41. A number of cycles after startup can be acquired by acquiring startup of the internal combustion engine 20.

The revolution speed computation unit 52 computes a revolution speed NE of the internal combustion engine 20 based on a detection signal from the crank sensor 42. The revolution speed computation unit 52 makes a cylinder determination based on detection signals from the crank sensor 42 and the cam sensor 43.

The wet computation unit 53 computes an amount of a fuel wet adhering to a wall surface of the internal combustion engine 20 facing to an injection field. The injection field means a field (space) where fuel is injected in the internal combustion engine 20 and specifically means the interior of a combustion chamber, the interior of an intake port, and the like. A wall surface of the internal combustion engine 20 facing to an injection field is a concept that can contain a wall surface of each configuration element of the internal combustion engine 20 at which injected fuel can arrive and concrete examples of a wall surface of the internal combustion engine 20 facing to an injection field include an inner wall surface of an intake port, an inner wall surface of an intake valve, a combustion chamber, or the like, and the like. The wet computation unit 53 is preferably configured to compute a fuel wet amount based on at least one of a required injection quantity of fuel, temperature information of the internal combustion engine 20, and a number of times of revolution of the internal combustion engine 20. The wet computation unit 53 further determines whether to require reduction of a fuel wet amount based on a computed fuel wet amount.

The load computation unit 54 computes a load on the internal combustion engine 20. For example, the load computation unit computes an operation load on the internal combustion engine 20 based on detection values from an intake air temperature sensor 14 and a crank angle sensor 29.

The injection control unit 55 controls a fuel injection valve 21 to control an injection of fuel into the internal combustion engine 20. More specifically, the injection control unit controls energization of a fuel injection valve 21 to control fuel injection timing and an injection period.

The injection control unit 55 acquires a counterflow generation period and a required injection quantity of fuel. The counterflow generation period is a period during which a counterflow is being generated in an injection field of the internal combustion engine 20. The required injection quantity is a total injection quantity of fuel injected into the internal combustion engine 20 within one combustion cycle.

When a required injection quantity cannot be injected during a counterflow generation period, the injection control unit 55 injects that surplus amount of fuel when an intake valve is closed. That is, when injecting fuel, the injection control unit 55 splits an injection into an intake valve closed injection made on the advance angle side relative to a counterflow generation period and a counterflow generated injection make during the counterflow generation period. The injection control unit 55 may further split each of an intake valve closed injection and a counterflow generated injection.

The VT control unit 56 controls the intake timing varying mechanism 22 and the exhaust timing varying mechanism 24 to control intake timing of taking air into a combustion chamber of the internal combustion engine 20 and exhaust timing of exhausting air from a combustion chamber.

When the wet computation unit 53 requests to reduce a fuel wet amount at the time of startup of the internal combustion engine 20, the VT control unit 56 executes wet reduction control to control at least either the intake timing varying mechanism 22 or the exhaust timing varying mechanism 24 so as to reduce a fuel wet amount by a counterflow. As wet reduction control, the VT control unit 56 preferably executes at least either exhaust valve closed advance angle control or intake valve opened advance angle control. In the exhaust valve closed advance angle control, exhaust valve closing timing is advanced ahead of an exhaust top dead center. In the intake valve opened advance angle control, intake valve opening timing is advanced ahead of an exhaust top dead center.

The VT control unit 56 controls at least either the intake timing varying mechanism 22 or the exhaust timing varying mechanism 24 to extend a counterflow generation period. The VT control unit thereby reduces a shortage of an actual counterflow generation period relative to a counterflow generation period (required counterflow generation period) required to evaporate fuel to reduce a fuel wet amount.

Figure 2:
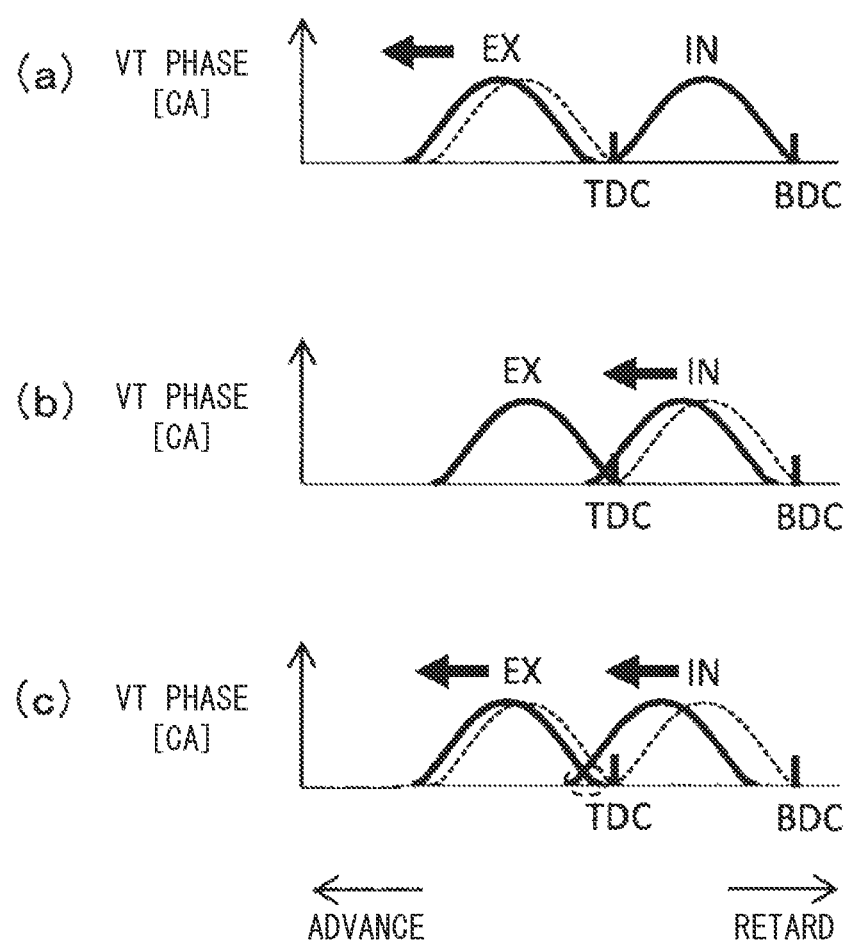
FIG. 2 is a drawing explaining exhaust/intake timing.
Figure 3:
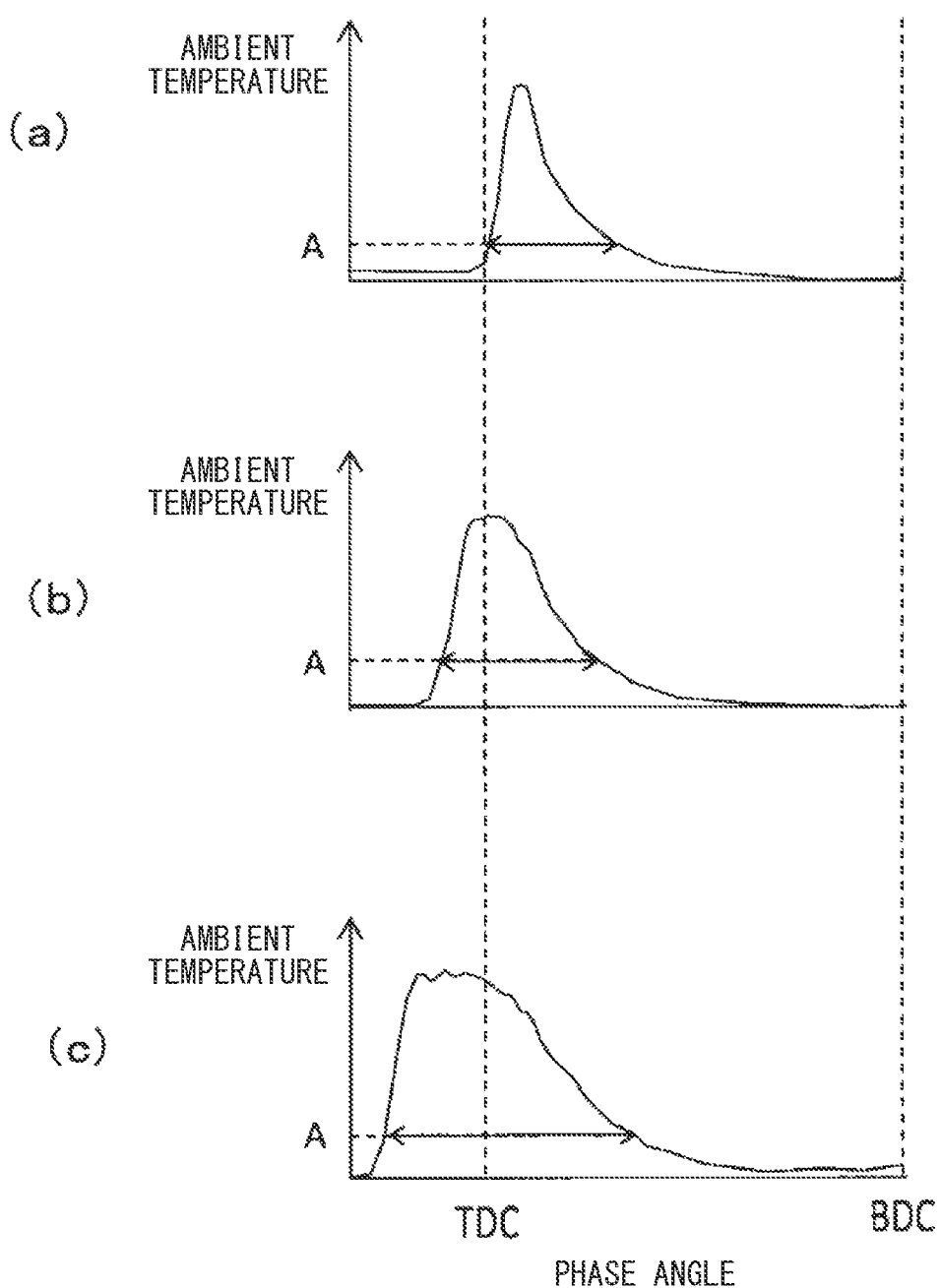
FIG. 3 is a drawing illustrating a relation between ambient temperature and phase angle.

A description will be given to that a counterflow generation period is extended by controlling the intake timing varying mechanism 22 or the exhaust timing varying mechanism 24 with reference to FIGS. 2 and 3. FIG. 2 shows a phase of valve timing; the curves indicated by "EX" show exhaust timing; and the curves indicated by "IN" show intake timing. FIG. 3 shows an ambient temperature of an injection field of the internal combustion engine 20 on the vertical axes and a phase angle on the horizontal axes. Temperature A shown on the vertical axes in FIG. 3 indicates a counterflow generation temperature and a period during which an ambient temperature is equal to or higher than the counterflow generation temperature A is equivalent to a counterflow generation period.

For example, in the first cycle after the startup of the internal combustion engine 20, exhaust valve closed advance angle control is preferably executed as wet reduction control. In this control, as shown in (a) in FIG. 2, valve closing timing of an exhaust valve is advanced ahead of an exhaust top dead center (indicated by TDC in FIG. 2). By exercising exhaust valve closed advance angle control, as shown in (a) in FIG. 3, air in a combustion chamber is more compressed and a counterflow can be effectively formed at a subsequent time of intake valve opening; therefore, a counterflow generation period can be lengthened.

In the second and following cycles after the startup of the internal combustion engine 20, as shown in (b) in FIG. 2, as wet reduction control, intake valve opened advance angle control is preferably executed to advance valve opening timing of an intake valve ahead of an exhaust top dead center of the internal combustion engine 20. By exercising intake valve opened advance angle control, as shown in (b) in FIG. 3, a counterflow generation period can be extended.

Further, the present disclosure may be configured to execute both exhaust valve closed advance angle control and intake valve opened advance angle control as wet reduction control, as shown in (c) in FIG. 2, for example, in the second and following cycles after the startup of the internal combustion engine 20. By exercising both exhaust valve closed advance angle control and intake valve opened advance angle control to control respective advance angle amounts, an overlap period during which both an exhaust valve and an intake valve are open can be controlled. By controlling an overlap period, a combustion state of the internal combustion engine 20 can be kept stable and further a counterflow generation period can be extended to reduce a fuel wet amount. For this reason, depending upon a combustion state of the internal combustion engine 20, as shown in (c) in FIG.

3, a counterflow generation period can be more extended than in cases where only intake valve opening timing is advanced.

In cases where degradation in a combustion state of the internal combustion engine 20 need be further improved by controlling ignition timing to the retard side or other like means, overlap period control is limited and to ensure a sufficiently long overlap period may be infeasible. In cases where a high-response timing varying mechanism cable of highly responsively actuating swiftly after the startup of the internal combustion engine 20 is not used as an intake timing varying mechanism 22 or an exhaust timing varying mechanism 24, control of an overlap period may be delayed and to ensure a sufficiently long overlap period may be infeasible. For example, there are cases where a high-response timing varying mechanism is used as an intake timing varying mechanism 22 but a low-response timing varying mechanism is used as an exhaust timing varying mechanism 24.

Figure 4:
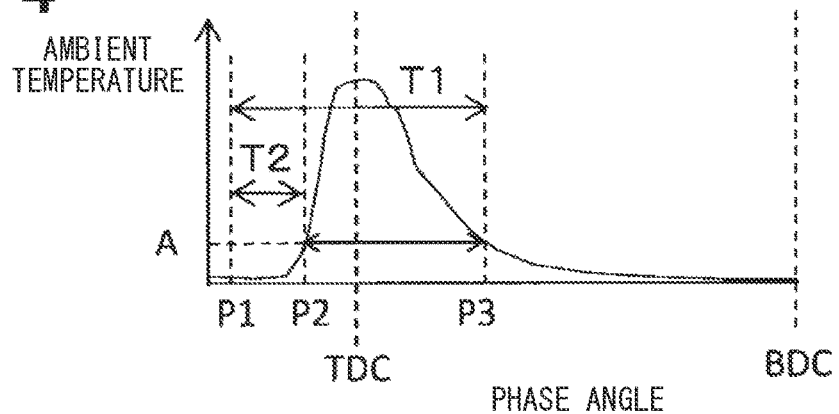
FIG. 4 is a drawing illustrating a relation between ambient temperature and phase angle.

In cases where a sufficiently long overlap period cannot be ensured as mentioned above, as shown in FIG. 4, an injection period T1 (represented as a period from phase angle P1 to phase angle P3) for completing an injection of fuel in a required injection quantity may be so long as to exceed a counterflow generation period (represented as a period from phase angle P2 to phase angle P3). In FIG. 4, an ambient temperature in an injection field of the internal combustion engine 20 is indicated on the vertical axis and a phase angle is indicated on the horizontal axis.

When an injection period T1 is longer than a counterflow generation period, as shown in FIG. 4, the injection period T1 includes an excess period T2 that is an injection period excluded from a counterflow generation period. Fuel injected during this excess period T2 can adhere to an intake port or the like of the internal combustion engine 20 as a fuel wet. However, when a length of an excess period T2 is equal to or shorter than a predetermined threshold value Xt2, during the subsequent counterflow generation periods, fuel once adhering to an intake port or the like as a fuel wet is separated from the intake port by a counterflow blowing back toward the intake port. That is, even when an injection period T1 for completing an injection of fuel in a required injection quantity is so long as to exceed a counterflow generation period, the injection of fuel can be completed without increasing a fuel wet amount in the following cases: cases where an excess period T2 thereof is equal to or shorter than a predetermined threshold value Xt2 and can be set on the advance angle side relative to the counterflow generation period. The threshold value Xt2 can be set, for example, according to a length of a counterflow generation period.

The ECU 50 may be so configured that a fuel wet amount is reduced by splitting an intake valve closed injection via the injection control unit 55. When a total injection quantity of fuel injected into the internal combustion engine 20 cannot be injected during one counterflow generation period, the injection control unit 55 may be configured to execute split injection control to control the fuel injection valve 21 so as to split an intake valve closed injection into a plurality of times of injection. By making a split injection, penetration force can be reduced during a fuel injection; therefore, a fuel wet amount can be reduced.

Figure 5:
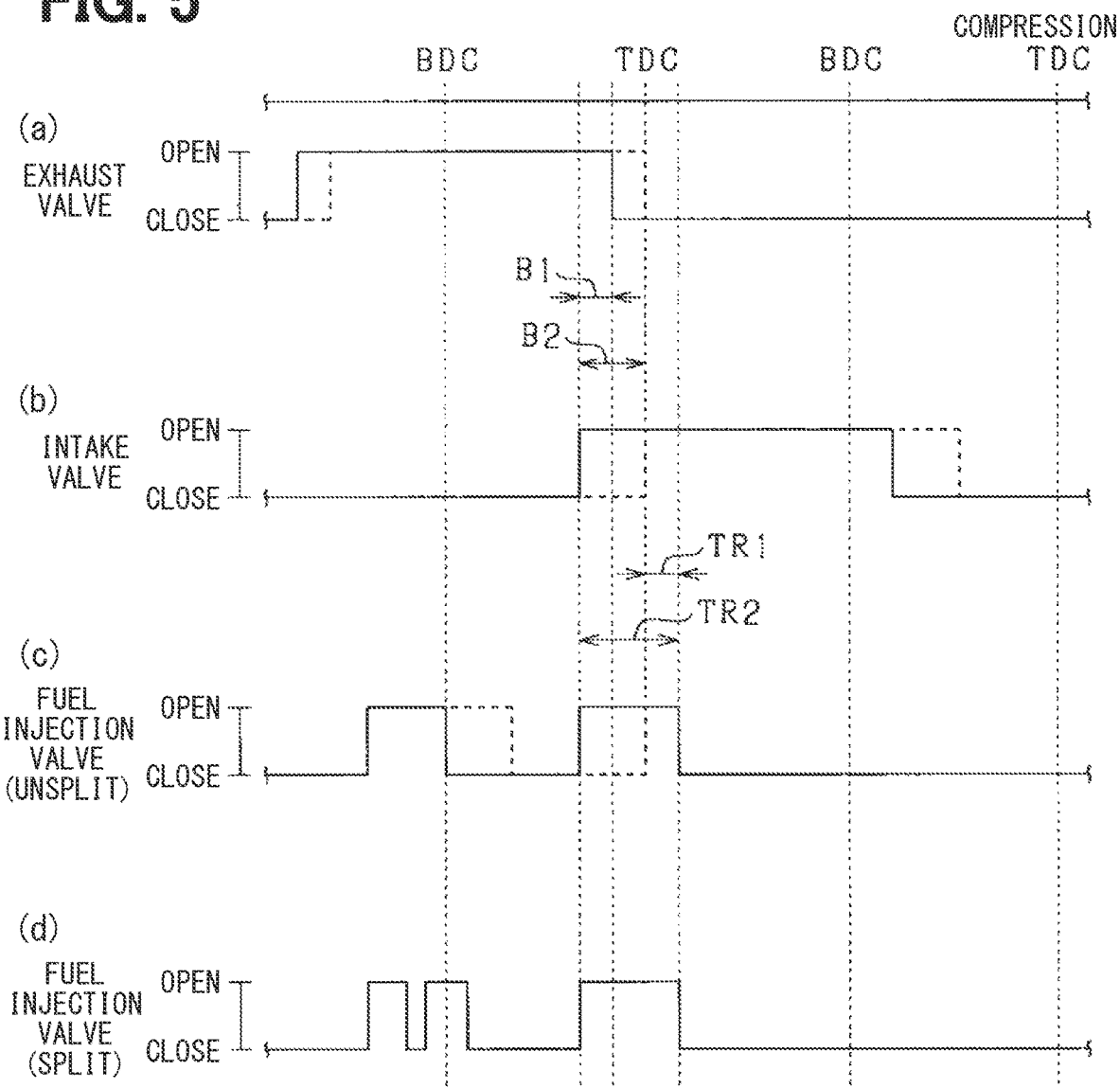
FIG. 5 is a drawing illustrating a relation between exhaust/intake timing and fuel injection timing.

FIG. 5 illustrates an example of split injection control. (a) to (d) in FIG. 5 are drawings respectively indicating opening/closing timing of an exhaust valve, an intake valve, and a fuel injection valve.

The broken line in (a) in FIG. 5 indicates a case where valve closing timing of the exhaust valve is at an exhaust top dead center and the solid line indicates a case where valve closing timing of the exhaust valve is advanced ahead of the exhaust top dead center by exhaust valve closed advance angle control. The broken line in (b) in FIG. 5 indicates a case where valve opening timing of the intake valve is at an exhaust top dead center and the solid line indicates a case where valve opening timing of the intake valve is advanced ahead of the exhaust top dead center by intake valve opened advance angle control. When only intake valve opened advance angle control is executed, an overlap period is as indicated by B2 but when both exhaust valve closed advance angle control and intake valve opened advance angle control are executed, an overlap period can be shortened as indicated by B1.

(c) in FIG. 5 indicates the opening/closing state of the fuel injection valve 21 obtained when an intake valve closed injection is not split. The broken line in (c) in FIG. 5 indicates a case where neither exhaust valve closed advance angle control nor intake valve opened advance angle control is executed and the solid line indicates a case where exhaust valve closed advance angle control and intake valve opened advance angle control are executed. By exercising exhaust valve closed advance angle control and intake valve opened advance angle control, a counterflow generation period is extended from that indicated by TR1 to that indicated by TR2. As a result, as indicated by the solid line, an injection period in an intake valve closed injection is shortened and an injection period in a counterflow generated injection is lengthened. As the result of a counterflow generation period being extended by wet reduction control by the VT control unit 56, the injection control unit 55 controls a fuel injection valve 21 so that fuel injected in an intake valve closed injection is reduced and fuel injected in a counterflow generated injection is increased; therefore, a fuel wet amount is reduced.

In comparison to (c) in FIG. 5, (d) in FIG. 5 indicates the opening/closing state of a fuel injection valve 21 obtained when an intake valve closed injection is split. A total quantity of fuel injected in an intake valve closed injection split into two in (d) in FIG. 5 is identical with a total quantity of fuel injected in a single intake valve closed injection in (c) in FIG. 5. However, when an intake valve closed injection is split a shown in (d) in FIG. 5, the penetration force of injected fuel can be reduced; therefore, this contributes to reduction in fuel wet amount.

The ECU 50 need not necessarily execute split injection control by the injection control unit 55 or wet reduction control by the VT control unit 56 every cycle from the first cycle after the startup of the internal combustion engine 20. For example, while only exhaust valve closed advance angle control in the first cycle after startup is executed, intake valve closed advance angle control in the second and following cycles may not be executed. While exhaust valve closed advance angle control in the first cycle after startup is executed, intake valve closed advance angle control in the second and following cycles after startup may not be executed.

Figure 6:
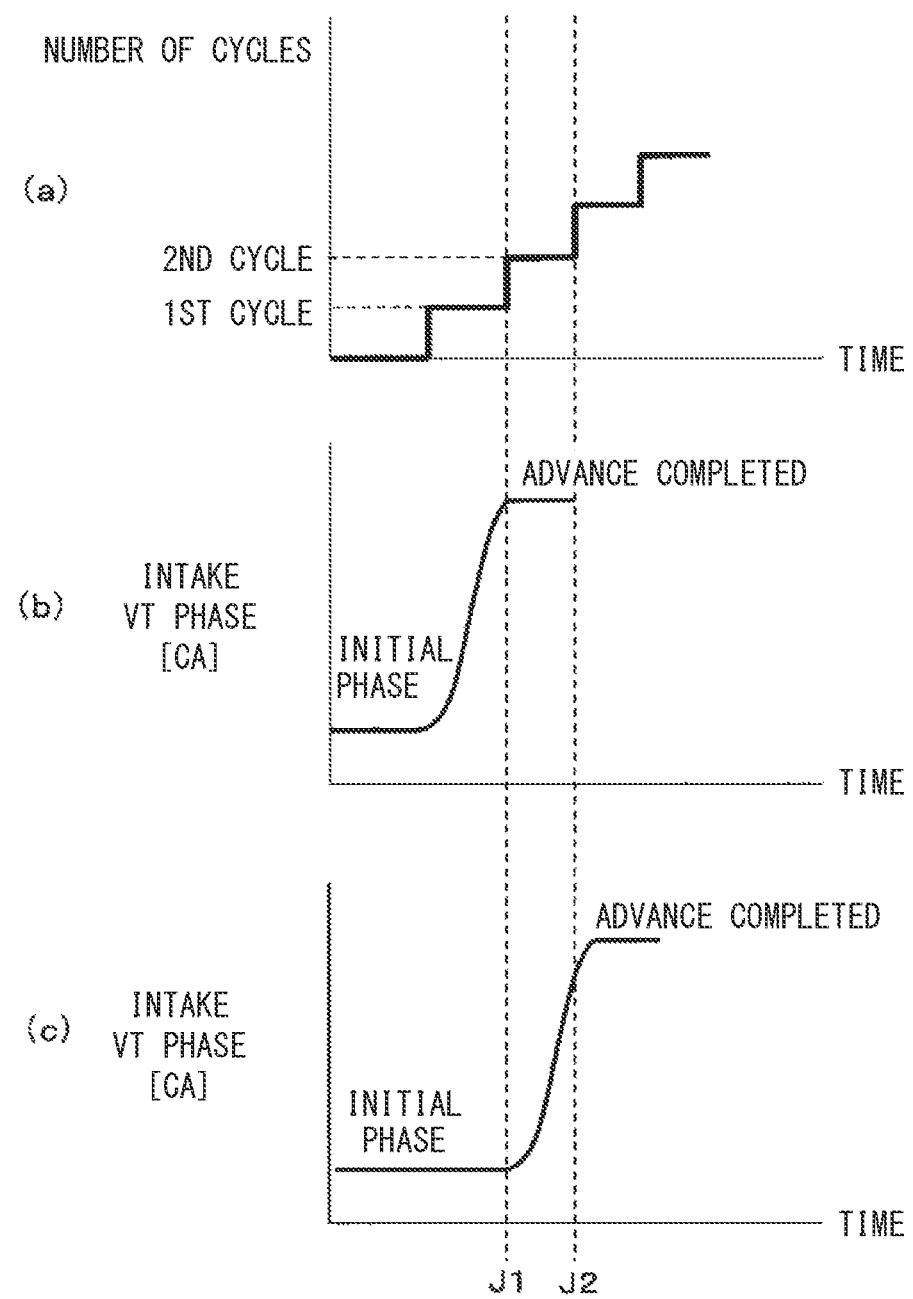
FIG. 6 is a drawing explaining advance angle in intake timing.

Control executed in each cycle may be started or completed at any time during a period from start to completion of the cycle. A description will be given with a case where intake valve opened advance angle control in the second cycle is executed taken as an example. For example, as shown in (a) and (b) in FIG. 6, advance angle control may be started before the start J1 of the second cycle and the advance angle control may be completed at the start J1 of the second cycle. Or, as shown in (a) and (c) in FIG. 6, advance angle control may be started at the start J1 of the second cycle and the advance angle control may be completed at the end J2 of the second cycle.

The ECU 50 may be configured to be able of determining which should be preferentially executed, split injection control by the injection control unit 55 or wet reduction control by the VT control unit 56, based on an operating state of the internal combustion engine 20 or the like. For example, the present disclosure may be so configured that when a revolution speed NE of the internal combustion engine 20 is equal to or higher than a predetermined revolution speed threshold value NX, a higher priority is given to split injection control by the injection control unit 55 than to wet reduction control by the VT control unit 56. When a revolution speed NE is high, a time per combustion cycle is short and a phase angle required to complete an injection of fuel in a required injection quantity is increased. For this reason, a revolution speed threshold value NX is set based on a revolution speed at which an injection period for completing an injection of fuel in a required injection quantity can be ensured. Further, for example, when a combustion state of the internal combustion engine 20 is not in a predetermined stable state, the ECU 50 may be so configured that a higher priority is given to split injection control by the injection control unit 55 than to wet reduction control by the VT control unit 56. The predetermined stable state cited here is a combustion state in which even when an internal EGR ratio is increased by wet reduction control by the VT control unit 56, an EGR ratio at which combustion becomes unstable is not exceeded.

Figure 7:
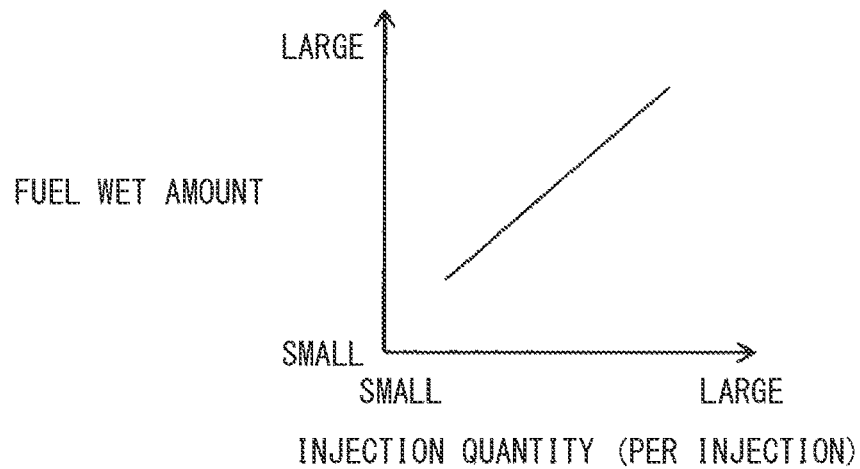
FIG. 7 is a drawing illustrating a relation between fuel wet amount and injection quantity.
Figure 8:
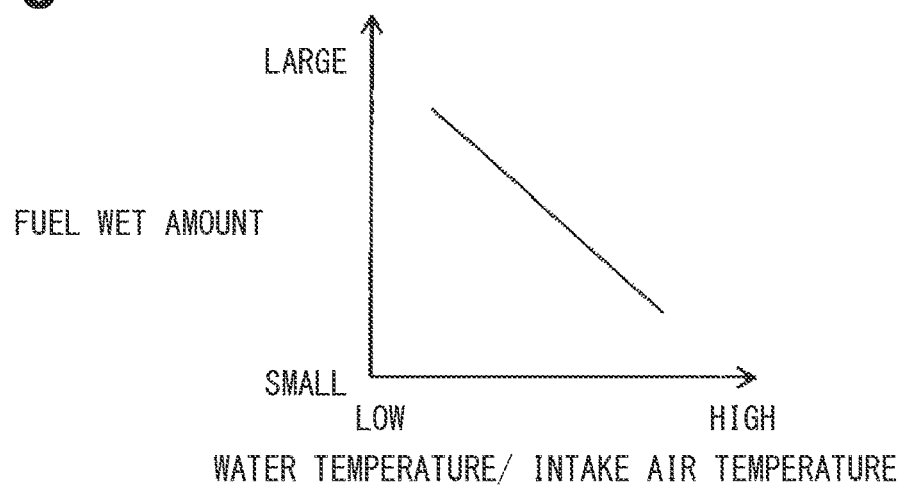
FIG. 8 is a drawing illustrating a relation between fuel wet amount and water temperature or intake air temperature.
Figure 9:
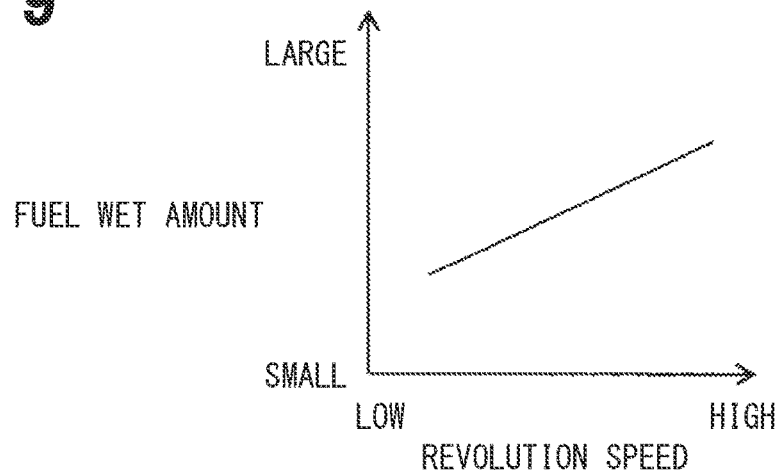
FIG. 9 is a drawing illustrating a relation between fuel wet amount and revolution speed of an internal combustion engine.

In the ECU 50, a table or a mathematical expression indicating relations between a fuel wet amount and each parameter as shown in FIG. 7 to FIG. 9 may be stored. FIG. 7 indicates a relation between a fuel wet amount and an injection quantity per injection and a fuel wet amount is increased with increase in injection quantity per injection. FIG. 8 indicates a relation between a fuel wet amount and a cooling water temperature or an intake air temperature of the internal combustion engine 20 and a fuel wet amount is reduced with increase in cooling water temperature or intake air temperature. FIG. 9 indicates a relation between a fuel wet amount and a revolution speed NE of the internal combustion engine 20 and a fuel wet amount is increased with increase in revolution speed NE. The wet computation unit 53 may be configured to refer to tables indicating a fuel wet amount and each parameter shown in FIG. 7 to FIG. 9 to compute a fuel wet amount.

Figure 10:
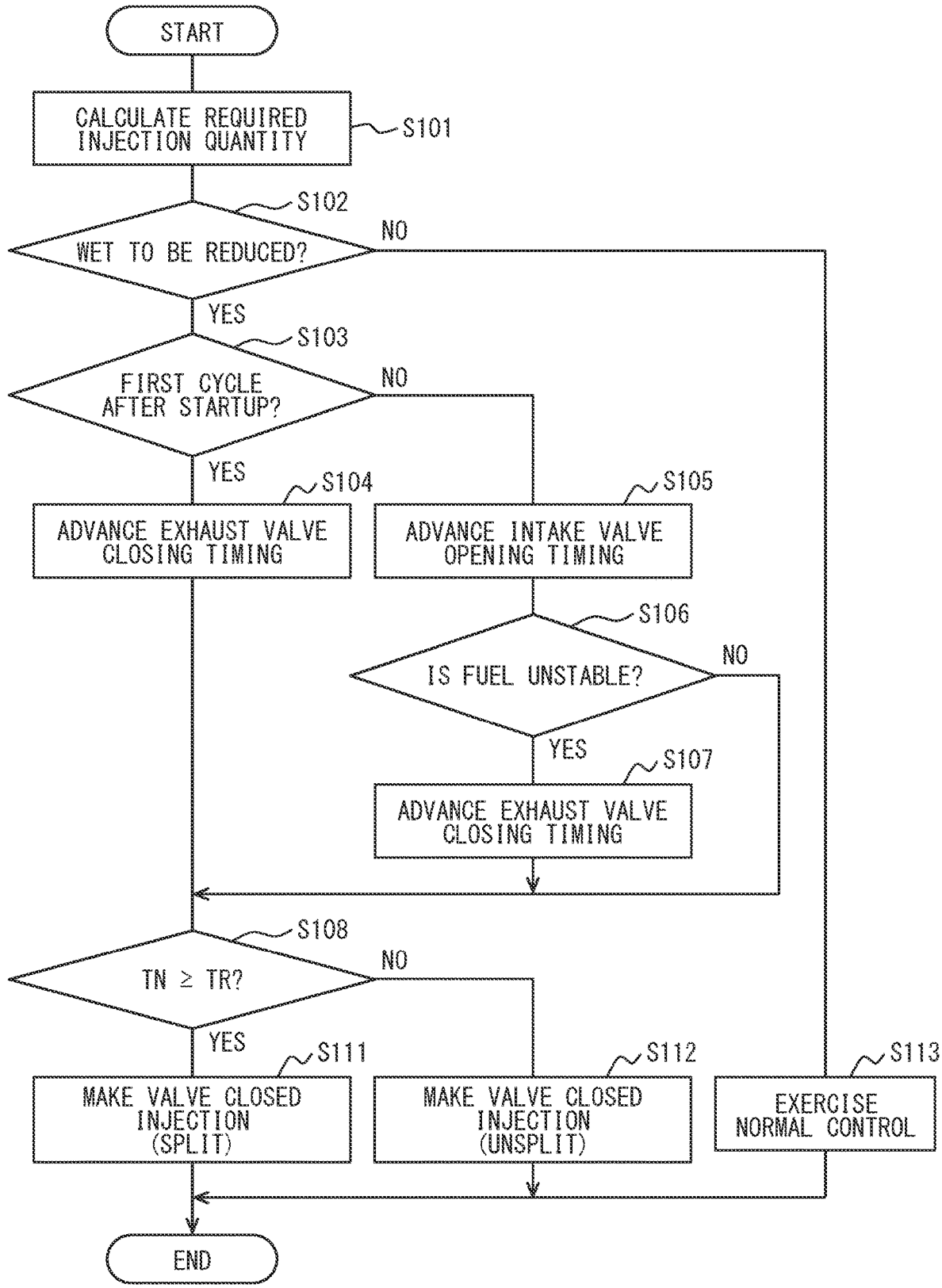
FIG. 10 is a flowchart of drive control processing for an internal combustion engine according to a first embodiment.

FIG. 10 is a flowchart of drive control processing for the internal combustion engine 20 performed by the ECU 50. This processing is repeatedly performed in a predetermined cycle. At Step S101, first, a required injection quantity, which is an injection quantity of fuel injected into the internal combustion engine 20 in one combustion cycle, is computed and the processing proceeds to Step S102.

At Step S102, it is determined whether to execute wet reduction control. More specifically, when a request is made to reduce a fuel wet amount, it is determined that wet reduction control should be executed. A determination of whether to execute wet reduction control is made based on, for example a wet amount computed by the wet computation unit 53. Specifically, for example, when a computed wet amount is equal to or larger than a predetermined threshold value, it is determined that wet reduction control should be executed. When a computed wet amount is smaller than the predetermined threshold value, it is determined that wet reduction control should not be executed.

Whether to execute wet reduction control may be determined based on various parameters, such as detection values from the intake air temperature sensor 45 and the outside air temperature sensor 46, that have an influence on a wet amount. Specifically, when various parameters based on the relations shown in FIG. 7 to FIG. 9 indicate that a wet amount is equal to or larger than a predetermined threshold value, it may be determined that wet reduction control should be executed. Further, whether to execute wet reduction control may be determined based on, for example, a number of cycles since the startup of the internal combustion engine 20. For example, it may be determined that wet reduction control should be executed for the first and following cycles in a predetermined number after the startup of the internal combustion engine 20.

When it is determined at Step S102 that wet reduction control should be executed, the processing proceeds to Step S103. The control at Steps S103 to S112 is processing performed in wet reduction control. When it is determined that wet reduction control should not be executed, the processing proceeds to Step S113. At the step, it is determined to execute normal control without wet reduction control and the processing is terminated.

At Step S103 as the first step of wet reduction control at Steps S103 to S112, it is determined whether the current cycle is the first cycle after the startup of the internal combustion engine 20. When the current cycle is the first cycle, the processing proceeds to Step S104. At Step S104, it is determined to advance exhaust valve closing timing of the internal combustion engine 20 and then the processing proceeds to Step S108.

When the current cycle is the second or later cycle, the processing proceeds to Step S105. At Step S105, it is determined to advance intake valve opening timing of the internal combustion engine 20 and an advance angle amount of the intake valve opening timing is computed. Thereafter, the processing proceeds to Step S106. At Step S106, it is determined whether a combustion state of the internal combustion engine 20 is unstable. For example, in cases where when intake valve closing timing is advanced based on the relations shown in FIG. 5, an internal EGR ratio in the internal combustion engine 20 becomes so high as to exceed an EGR ratio at which fuel becomes unstable, it is determined that a combustion state is unstable. When it is determined at Step S106 that a combustion state is unstable, the processing proceeds to Step S107. At the step, it is determined to advance exhaust valve closing timing of the internal combustion engine 20 and such an advance angle amount of exhaust valve closing timing that an internal EGR ratio will not exceed an EGR ratio at which fuel becomes unstable is computed. Thereafter, the processing proceeds to Step S108. When it is determined at Step S106, a combustion state is not unstable, the processing proceeds to Step S108.

At Step S108, it is determined whether an injection period TN is equal to or shorter than an actual counterflow generation period TR. When TN≥TR, the processing proceeds to Step S111. At the step, it is determined to make a split injection in a valve closed injection and the processing is terminated. When TN<TR, the processing proceeds to Step S112 and it is determined not to make a split injection in a valve closed injection and the processing is terminated.

According to the first embodiment, as mentioned above, when it is determined at Step S102 that a request has been made to reduce a fuel wet amount, which is a quantity of fuel adhering to a wall surface of the internal combustion engine 20 facing to an injection field, the wet reduction control shown at Steps S103 to S112 is executed. In wet reduction control, at least either the intake timing varying mechanism 22 and the exhaust timing varying mechanism 24 is controlled so as to reduce the fuel wet amount by a counterflow blowing back toward the intake port. A more specific description will be given. As shown at Steps S104 to S107, a counterflow generation period TR can be extended by exercising control to advance exhaust valve closing timing or control to advance intake valve opening timing. For this reason, by actively utilizing a counterflow, effects of an increased temperature of an injection field and the like can be obtained and by extension an effect of a reduced fuel wet amount can be obtained. As a result, a fuel wet in the internal combustion engine 20 can be reduced to improve an emission.

According to the first embodiment, as shown at Steps S103 and S104, in the first cycle after the startup of the internal combustion engine 20, control to advance exhaust valve closing timing is executed to compress air in a combustion chamber of the internal combustion engine 20. As a result, a counterflow can be effectively formed at the subsequent times of intake valve opening.

As shown at Steps S103 and S105, in the second and following cycles after the startup of the internal combustion engine 20, control to advance intake valve opening timing is executed and a counterflow generation period can be thereby extended. As shown at Steps S106 and S107, when a combustion state becomes unstable as the result of advancing intake valve opening timing, exhaust valve closing timing is advanced to prevent an internal EGR ratio in the internal combustion engine 20 from becoming so high as to exceed an EGR at which fuel becomes unstable. For this reason, while a combustion state of the internal combustion engine 20 is kept stable, a fuel wet amount can be reduced.

According to the first embodiment, as shown at Steps S108, S111, and S112, when an injection period TN is equal to or longer than an actual counterflow generation period TR, an injection of fuel made at the time of intake valve closing can be split. By making a split injection, penetration force can be reduced during a fuel injection; therefore, a fuel wet amount can be reduced.

Second Embodiment

Figure 11:
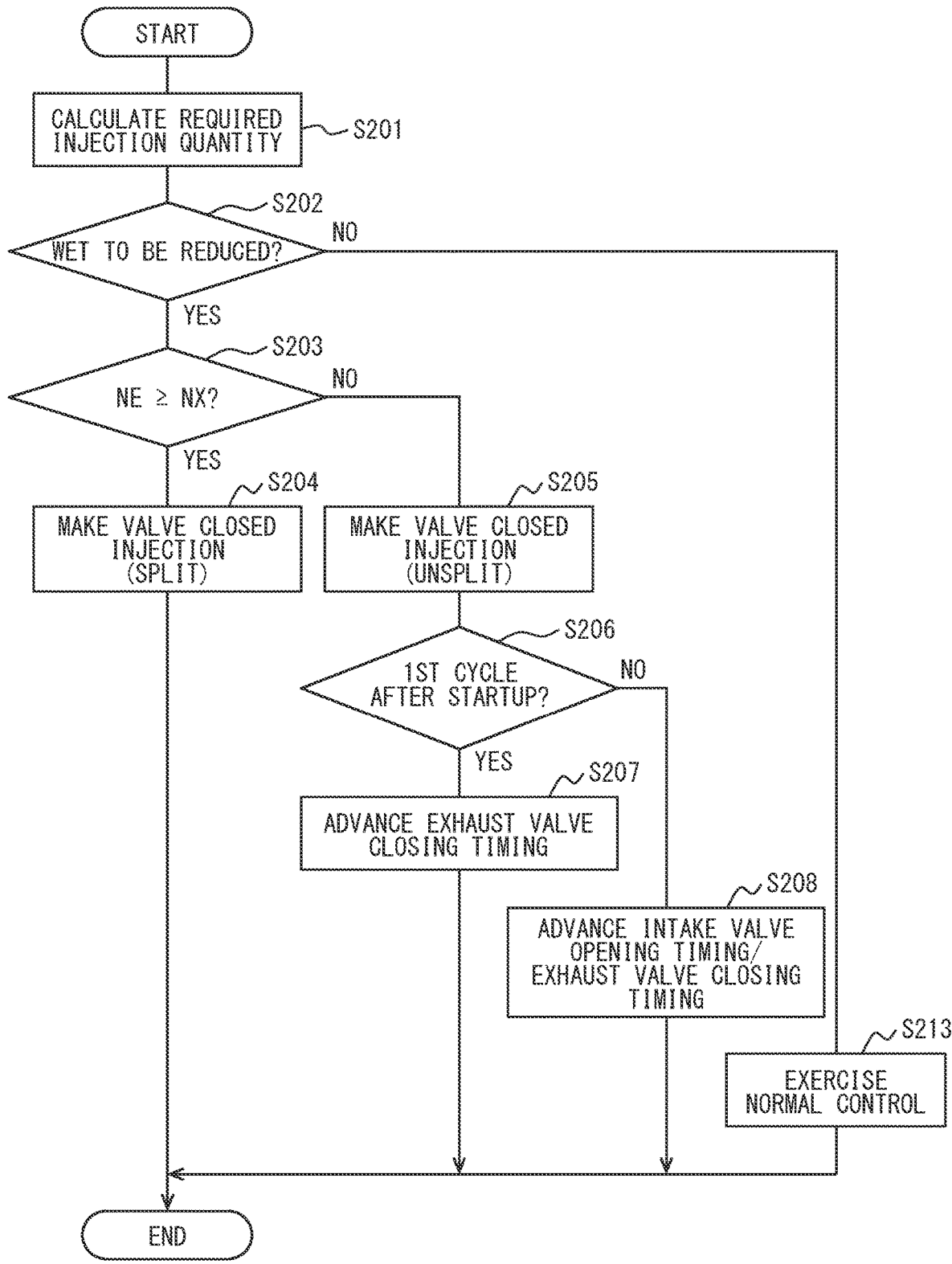
FIG. 11 is a flowchart of drive control processing for an internal combustion engine according to a second embodiment.

FIG. 11 is a flowchart of drive control processing for the internal combustion engine 20 performed by the ECU 50 in the second embodiment. This processing is repeatedly performed in a predetermined cycle.

At Step S201, as at Step S101, a required injection quantity is computed and the processing proceeds to Step S202. At Step S202, as at Step S102, it is determined whether to execute wet reduction control. When wet reduction control is executed, the processing proceeds to Step S203. When wet reduction control is not executed, the processing proceeds to Step S213. At the step, as at Step S113, it is determined to execute normal control without wet reduction control and the processing is terminated.

At Step S203, it is determined whether a revolution speed NE of the internal combustion engine 20 is lower than a predetermined revolution speed threshold value NX. The revolution speed threshold value NX is set according to a required injection quantity. For example, a revolution speed threshold value NX is set to a lower limit value of revolution speed at which an injection period for completing an injection of fuel in a required injection quantity is difficult to ensure. When NE≥NX, the processing proceeds to Step S204. At the step, as at Step S111, it is determined to make a split injection in a valve closed injection and the processing is terminated. When NE<NX, the processing proceeds to Step S205. At the step, as at Step S112, it is determined to make a split injection in a valve closed injection and then the processing proceeds to Step S206.

At Step S206, as at Step S103, it is determined whether the current cycle is the first cycle after the startup of the internal combustion engine 20. When the current cycle is the first cycle after startup, the processing proceeds to Step S207. At the step, as at Step S104, it is determined to advance exhaust valve closing timing of the internal combustion engine 20 and then the processing is terminated. When it is determined at Step S206 that the current cycle is the second or later cycle, the processing proceeds to Step S208. At the step, it is determined to advance intake valve opening timing of the internal combustion engine 20 and advance exhaust valve closing timing thereof, respective advance angle amounts are computed and then the processing is terminated.

According to the second embodiment, as mentioned above, when a revolution speed NE of the internal combustion engine 20 is high, that is, when NE≥NX, a time per combustion cycle is short; therefore, a phase angle required to complete an injection of fuel in a required injection quantity is increased. By preferentially making fuel wet amount reduction by a split injection at the time of intake valve closing as shown at Step S204, a sufficient injection period can be ensured to complete an injection of fuel in a required injection quantity.

When a revolution speed NE of the internal combustion engine 20 is low, that is, when NE<NX, a time per combustion cycle is long; therefore, a phase angle required to complete an injection of fuel in a required injection quantity becomes relatively small. For this reason, as shown at Steps S206 to S208, processing of effectively forming a counterflow or processing of extending a counterflow generation period is performed to preferentially make fuel wet amount reduction. According to the second embodiment, more appropriate processing for fuel wet amount reduction can be selected and preferentially performed according to an operating state of the internal combustion engine 20.

In place of a determination by a revolution speed NE of the internal combustion engine 20 shown at Step S203, a determination may be made by a combustion state of the internal combustion engine 20. Specifically, the present disclosure may be so configured that: when an operating state of the internal combustion engine 20 is unstable, at Step S203, the processing proceeds to the affirmative judgment side and when an operating state of the internal combustion engine 20 is stable, at Step S203, the processing proceeds to the negative judgment side. For example, when an operation load on the internal combustion engine 20 computed by the load computation unit 54 is less than a predetermined load or when an injection retard angle amount is large in ignition of the igniter 28, it is determined that a combustion state of the internal combustion engine 20 is unstable and fuel wet amount reduction by a split injection at the time of intake valve closing can be preferentially made.

When processing of effectively forming a counterflow or processing of extending a counterflow generation period is performed as shown at Steps S206 to S208, an internal EGR ratio in the internal combustion engine 20 can be increased. For this reason, in cases where there is fear that a combustion state is so unstable that an internal EGR ratio is increased and exceed an EGR ratio at which fuel is unstable, as shown at Step S204, fuel wet amount reduction by a split injection at the time of intake valve closing is preferentially made. By preferentially making fuel wet amount reduction by a split injection at the time of intake valve closing for the prevention of increase in internal EGR ratio, a combustion state of the internal combustion engine 20 can be kept stable to reduce a fuel wet amount.

According to each of the above-mentioned embodiments, the following effects are brought about:

The ECU 50 functions as a drive control device of the internal combustion engine 20. The internal combustion engine 20 includes: a fuel injection valve 21 injecting fuel; the intake timing varying mechanism 22 controlling the opening/closing of an intake valve provided at an intake port; and the exhaust timing varying mechanism 24 controlling the opening/closing of an exhaust valve provided at an exhaust port.

The ECU 50 includes the VT control unit 56 that controls at least either the intake timing varying mechanism 22 or the exhaust timing varying mechanism 24. When a request has been made to reduce a fuel wet amount, which is a quantity of fuel adhering to a wall surface of the internal combustion engine 20 facing to an injection field where fuel is injected, at the time of the startup of the internal combustion engine 20, the VT control unit 56 executes wet reduction control. In the wet reduction control, at least either the intake timing varying mechanism 22 or the exhaust timing varying mechanism 24 is controlled so as to reduce the fuel wet amount by a counterflow blowing back toward an intake port. According to the wet reduction control, by utilizing a counterflow blowing back toward an intake port, effects of an increased temperature in the injection field and the like can be obtained and by extension, an effect of a reduced fuel wet amount can be obtained. As a result, a fuel wet in the internal combustion engine 20 can be reduced to improve an emission.

The VT control unit 56 may be configured to, as wet reduction control, execute control to advance valve opening timing of an intake valve ahead of an exhaust top dead center of the internal combustion engine 20 in the second and following cycles after the startup of the internal combustion engine 20. According to this control, a counterflow generation period can be extended to reduce a fuel wet amount.

The VT control unit 56 may be configured to, as wet reduction control, execute control to advance valve closing timing of an exhaust valve ahead of an exhaust top dead center of the internal combustion engine 20 in the first cycle after the startup of the internal combustion engine 20. According to this control, air in a combustion chamber of the internal combustion engine 20 can be compressed and a counterflow can be effectively formed at the subsequent times of intake valve closing to reduce a fuel wet amount.

The VT control unit 56 may be configured to, as wet reduction control, execute control to advance valve closing timing of an exhaust valve ahead of an exhaust top dead center of the internal combustion engine 20 in the first cycle after the startup of the internal combustion engine 20 and further execute control to advance valve opening timing of an intake valve ahead of an exhaust top dead center of the internal combustion engine 20 in the second and following cycles after the startup of the internal combustion engine 20. According to this control, a counterflow generation period can be extended to reduce a fuel wet amount between the first cycle immediately after the startup of the internal combustion engine 20 and a predetermined cycle in which the internal combustion engine 20 has been started after the second cycle.

The VT control unit 56 may be configured to, as wet reduction control, execute control to advance valve closing timing of an exhaust valve ahead of an exhaust top dead center of the internal combustion engine 20 in the second or later cycle after the startup of the internal combustion engine 20 and further execute control to advance valve opening timing of an intake valve ahead of an exhaust top dead center of the internal combustion engine 20. When a combustion state becomes unstable as the result of advancing intake valve opening timing, an internal EGR ratio in the internal combustion engine 20 is prevented from becoming so large as to exceed an EGR ratio at which fuel becomes unstable by advancing exhaust valve closing timing. For this reason, while a combustion state of the internal combustion engine 20 is kept stable, a fuel wet amount can be reduced.

The ECU 50 may further include the injection control unit 55 controlling an injection of fuel into the internal combustion engine 20. The injection control unit 55 may be configured to execute split injection control when a counterflow generation period, which is a period during which a counterflow is being generated in an injection field in the internal combustion engine 20, is acquired and the total injection quantity of fuel to be injected into the internal combustion engine 20 in one cycle cannot be injected during the counterflow generation period. In the split injection control, a fuel injection valve is controlled to split an intake valve closed injection in which fuel is injected at the time of intake valve closing into a plurality of times of injection. Since penetration force at the time of a fuel injection can be reduced by making a split injection, a fuel wet amount can be reduced.

When a revolution speed NE of the internal combustion engine 20 is equal to or higher than a revolution speed threshold value NX, the ECU 50 may be configured to give a higher priority to wet reduction control by the VT control unit 56 than to split injection control by the injection control unit 55. When a time per combustion cycle is short and a phase angle required to complete an injection of fuel in a required injection quantity is increased, a sufficient injection period to complete an injection of fuel in a required injection quantity can be ensured by giving a higher priority to the above wet reduction control than to split injection control by the injection control unit 55.

When a combustion state of the internal combustion engine 20 is not a predetermined stable state, the ECU 50 gives a higher priority to split injection control by the injection control unit 55 than to wet reduction control by the VT control unit 56. When a combustion state of the internal combustion engine 20 is not stable, fuel wet amount reduction by a split injection at the time of intake valve closing for the prevention of increase in internal EGR ratio is preferentially made. As a result, a combustion state of the internal combustion engine 20 can be kept stable to reduce a fuel wet amount.

The ECU 50 may further include the wet computation unit 53 that determines a fuel wet amount based on at least one of a required injection quantity of fuel, temperature information of the internal combustion engine 20, and a number of times of revolution of the internal combustion engine 20.

A control unit described in the present disclosure and a technique therefor may be implemented by a dedicated computer provided by configuring a processor and a memory programmed to perform one or more functions embodied by a computer program. Or, a control unit described in the present disclosure and a technique therefor may be implemented by dedicated computer provided by configuring a processor with one or more dedicated hardware logic circuits. Alternatively, a control unit described in the present disclosure and a technique therefor may be implemented by one or more dedicated computers configured with a combination of a processor and a memory programmed to execute one or more functions and a processor configured of one or more hardware logic circuits. A computer program may be stored in a computer-readable non-transitory tangible recording medium as an instruction executed by a computer.

The present disclosure has been described in accordance with embodiments but it is understood that the present disclosure is not limited to the above-mentioned embodiments or structures. The present disclosure also includes various modifications and modifications within an equivalent range. In addition, various combinations and modes and other combinations and modes obtained by adding only one element or more or less element to the combinations and modes are also included in the category and technical scope of the present disclosure.

What is claimed is:

1. A drive control device for an internal combustion engine, the internal combustion engine including a fuel injection valve, which is configured to inject fuel, an intake timing varying mechanism, which is configured to control opening/closing of an intake valve provided at an intake port, and an exhaust timing varying mechanism, which is configured to control opening/closing of an exhaust valve provided at an exhaust port, the drive control device comprising:
a valve timing control unit configured to execute a wet reduction control to control at least one of the intake timing varying mechanism or the exhaust timing varying mechanism to reduce a fuel wet amount, which is a quantity of fuel adhering to a wall surface of the internal combustion engine facing to an injection field where the fuel is to be injected, by a counterflow blowing back toward the intake port, when a request is made to reduce the fuel wet amount in a startup of the internal combustion engine, wherein
the valve timing control unit is configured
not to execute, as the wet reduction control, a control to advance a valve opening timing of the intake valve ahead of an exhaust top dead center of the internal combustion engine in a first cycle after the startup of the internal combustion engine and
to execute, as the wet reduction control, the control to advance the valve opening timing of the intake valve ahead of the exhaust top dead center of the internal combustion engine in second and later cycle after the startup of the internal combustion engine.

2. A drive control device for an internal combustion engine, the internal combustion engine including a fuel injection valve, which is configured to inject fuel, an intake timing varying mechanism, which is configured to control opening/closing of an intake valve provided at an intake port, and an exhaust timing varying mechanism, which is configured to control opening/closing of an exhaust valve provided at an exhaust port, the drive control device comprising:
a valve timing control unit configured to execute a wet reduction control to control at least one of the intake timing varying mechanism or the exhaust timing varying mechanism to reduce a fuel wet amount, which is a quantity of fuel adhering to a wall surface of the internal combustion engine facing to an injection field where the fuel is to be injected, by a counterflow blowing back toward the intake port, when a request is made to reduce the fuel wet amount in a startup of the internal combustion engine, and
a cycle determination unit configured to determine whether a current cycle is a first cycle after startup of the internal combustion engine,
a counterflow generation period determination unit configured to determine whether an injection period is equal to or greater than an actual counterflow generation period; and
an injection control unit, wherein
the valve timing control unit is configured to execute, as the wet reduction control, a control to advance a valve closing timing of the exhaust valve ahead of an exhaust top dead center of the internal combustion engine on determination of the cycle determination unit that the current cycle is the first cycle after the startup of the internal combustion engine;
the injection control unit is configured
to perform a split injection on determination of the counterflow generation period determination unit that the injection period is equal to or greater than the actual counterflow generation period, and
not to perform the split injection on determination of the counterflow generation period determination unit that the injection period is less than the actual counterflow generation period.

3. A drive control device for an internal combustion engine, the internal combustion engine including a fuel injection valve, which is configured to inject fuel, an intake timing varying mechanism, which is configured to control opening/closing of an intake valve provided at an intake port, and an exhaust timing varying mechanism, which is configured to control opening/closing of an exhaust valve provided at an exhaust port, the drive control device comprising:
a valve timing control unit configured to execute a wet reduction control to control at least one of the intake timing varying mechanism or the exhaust timing varying mechanism to reduce a fuel wet amount, which is a quantity of fuel adhering to a wall surface of the internal combustion engine facing to an injection field where the fuel is to be injected, by a counterflow blowing back toward the intake port, when a request is made to reduce the fuel wet amount in a startup of the internal combustion engine, wherein
the valve timing control unit is configured to execute, as the wet reduction control,
a control to advance a valve closing timing of the exhaust valve ahead of an exhaust top dead center of the internal combustion engine in a first cycle after the startup of the internal combustion engine and
a control to advance a valve opening timing of the intake valve ahead of the exhaust top dead center of the internal combustion engine in second and later cycle after the startup of the internal combustion engine.

4. The drive control device according to claim 1, wherein the valve timing control unit is configured to execute, as the wet reduction control, a control to advance a valve closing timing of the exhaust valve ahead of the exhaust top dead center of the internal combustion engine in the second and later cycle after the startup of the internal combustion engine.

5. The drive control device according to claim 1, further comprising:
an injection control unit configured to
acquire a counterflow generation period, which is a period in which the counterflow is generated in the injection field, and execute a split injection control to control the fuel injection valve to split an intake valve closed injection, which is fuel injection performed when the intake valve is closed, into a plurality of times of injection, when fuel cannot be injected by a total injection quantity, by which fuel is to be injected into the internal combustion engine in one cycle, during the counterflow generation period.

6. A drive control device for an internal combustion engine, the internal combustion engine including a fuel injection valve, which is configured to inject fuel, an intake timing varying mechanism, which is configured to control opening/closing of an intake valve provided at an intake port, and an exhaust timing varying mechanism, which is configured to control opening/closing of an exhaust valve provided at an exhaust port, the drive control device comprising:

a valve timing control unit configured to execute a wet reduction control to control at least one of the intake timing varying mechanism or the exhaust timing varying mechanism to reduce a fuel wet amount, which is a quantity of fuel adhering to a wall surface of the internal combustion engine facing to an injection field where the fuel is to be injected, by a counterflow blowing back toward the intake port, when a request is made to reduce the fuel wet amount in a startup of the internal combustion engine; and an injection control unit configured to acquire a counterflow generation period, which is a period in which the counterflow is generated in the injection field, and execute a split injection control to control the fuel injection valve to split an intake valve closed injection, which is fuel injection performed when the intake valve is closed, into a plurality of times of injection, when fuel cannot be injected by a total injection quantity, by which fuel is to be injected into the internal combustion engine in one cycle, during the counterflow generation period.

7. The drive control device according to claim 6, wherein the valve timing control unit is configured to execute, as the wet reduction control, a control to advance a valve opening timing of the intake valve ahead of an exhaust top dead center of the internal combustion engine in second and later cycle after the startup of the internal combustion engine.

8. The drive control device according to claim 5, wherein when a revolution speed of the internal combustion engine is equal to or higher than a predetermined revolution speed threshold value, a higher priority is given to the split injection control by the injection control unit than to the wet reduction control by the valve timing control unit.

9. The drive control device according to claim 5, wherein when a combustion state of the internal combustion engine is not a predetermined stable state, a higher priority is given to the split injection control by the injection control unit than to the wet reduction control by the valve timing control unit.

10. The drive control device according to claim 1, further comprising:

a wet computation unit configured to compute the fuel wet amount based on at least one of a required injection quantity of the fuel, temperature information of the internal combustion engine, or a number of times of revolution of the internal combustion engine.

11. The drive control device according to claim 1, further comprising:

a processor configured to, as the valve timing control unit, execute the wet reduction control in response to the request.

12. The drive control device according to claim 2, further comprising:

a processor configured to, as the valve timing control unit, execute the wet reduction control in response to the request.

13. The drive control device according to claim 3, further comprising:

a processor configured to, as the valve timing control unit, execute the wet reduction control in response to the request.

14. The drive control device according to claim 6, further comprising:

a processor configured to, as the valve timing control unit, execute the wet reduction control in response to the request.

* * * * *